United States Patent [19]

McEwen

[11] 4,347,669
[45] * Sep. 7, 1982

[54] NAVIGATIONAL CALCULATING DEVICE

[76] Inventor: David M. McEwen, 4010 Keewahdin Rd. North Street, Mich. 48049

[*] Notice: The portion of the term of this patent subsequent to Jun. 24, 1997, has been disclaimed.

[21] Appl. No.: 161,061

[22] Filed: Jun. 19, 1980

Related U.S. Application Data

[63] Continuation-in-part of Ser. No. 51,678, Jun. 25, 1979, Pat. No. 4,208,805.

[51] Int. Cl.³ .............................................. B43L 5/00
[52] U.S. Cl. ....................................... 33/431; 33/453; 33/457
[58] Field of Search .......... 33/431, 457, 453, 424–427, 33/464, 15 B, 15 D; 235/61 NV, 61 GM

[56] References Cited

U.S. PATENT DOCUMENTS

| | | |
|---|---|---|
| 1,439,936 | 12/1922 | Wyckoff . |
| 1,730,852 | 10/1929 | Jenny . |
| 2,419,203 | 4/1947 | Edwards . |
| 2,481,846 | 9/1949 | King . |
| 2,521,915 | 9/1950 | Hattil . |
| 3,034,713 | 5/1962 | Kuzenko . |
| 3,137,443 | 6/1964 | Samuelson . |
| 3,414,190 | 12/1968 | Lemiesz . |
| 3,846,913 | 11/1974 | Johansson .................... 33/15 D X |
| 4,208,805 | 6/1980 | McEwen ....................... 33/457 X |

FOREIGN PATENT DOCUMENTS 394895  7/1933  United Kingdom .

Primary Examiner—Harry N. Haroian
Attorney, Agent, or Firm—Harness, Dickey & Pierce

[57] ABSTRACT

This disclosure relates to a new navigational calculating device which provides a mechanical means of solving position finding problems by solving a plane right triangle. It is an alternative to traverse tables, trigonometric formulas, and chart plotting for determining a dead reckoning position. It is particularly useful for small water-going craft in which conventional methods of navigation are difficult or impractical. A plotting board may be used to provide a visual application of calculation results.

14 Claims, 6 Drawing Figures

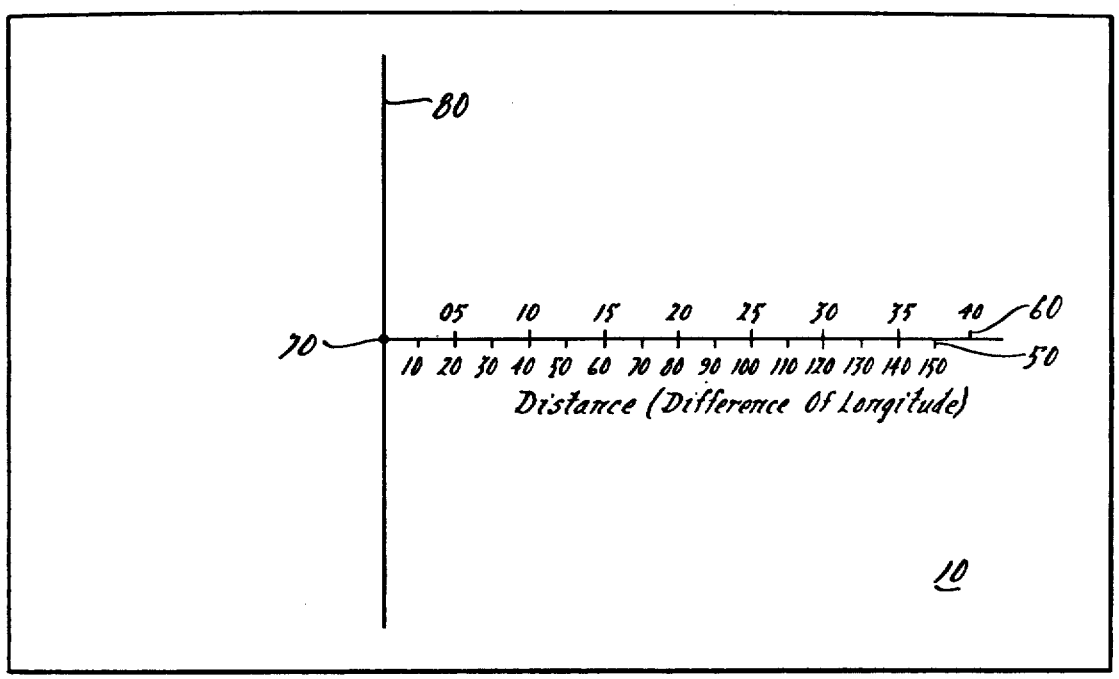
FIG. 2.
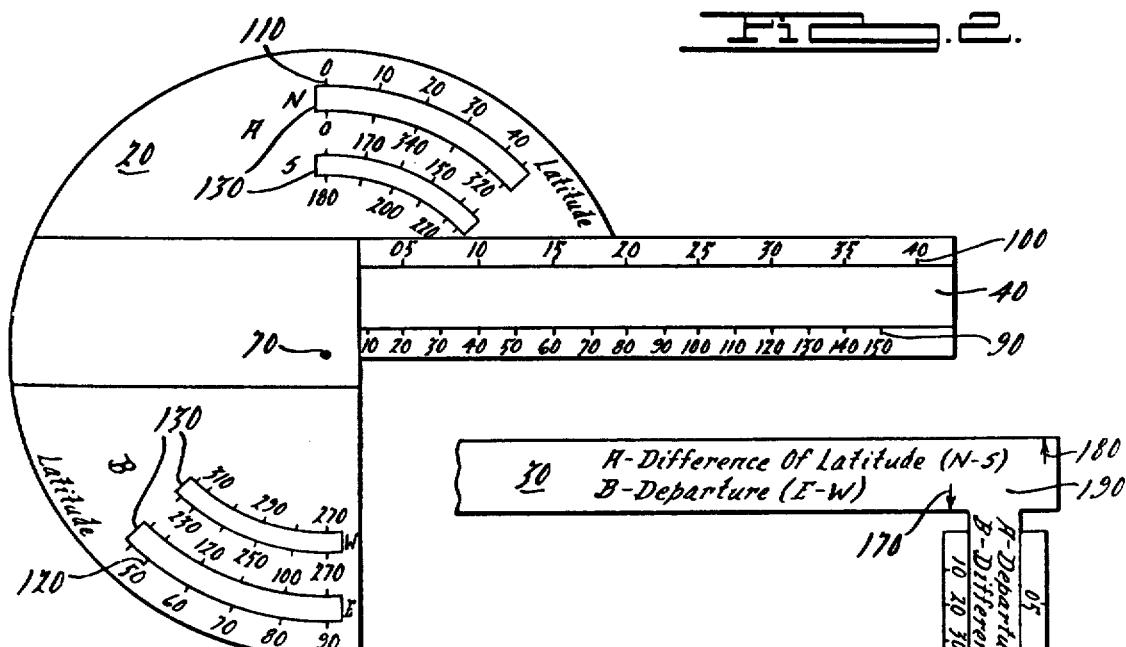
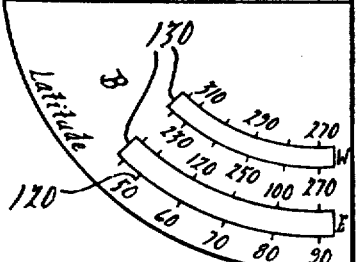
FIG. 3.
FIG. 4.

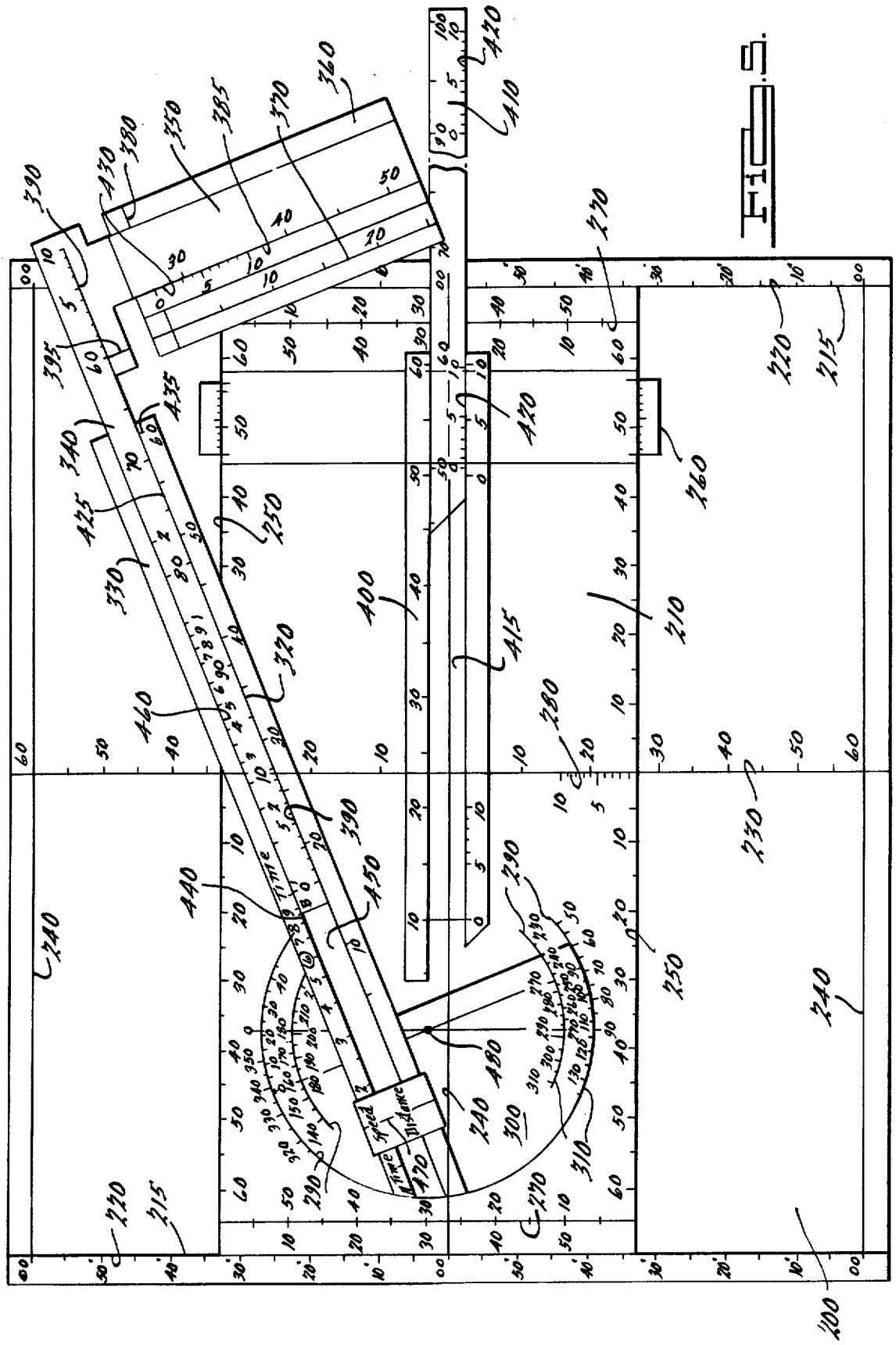

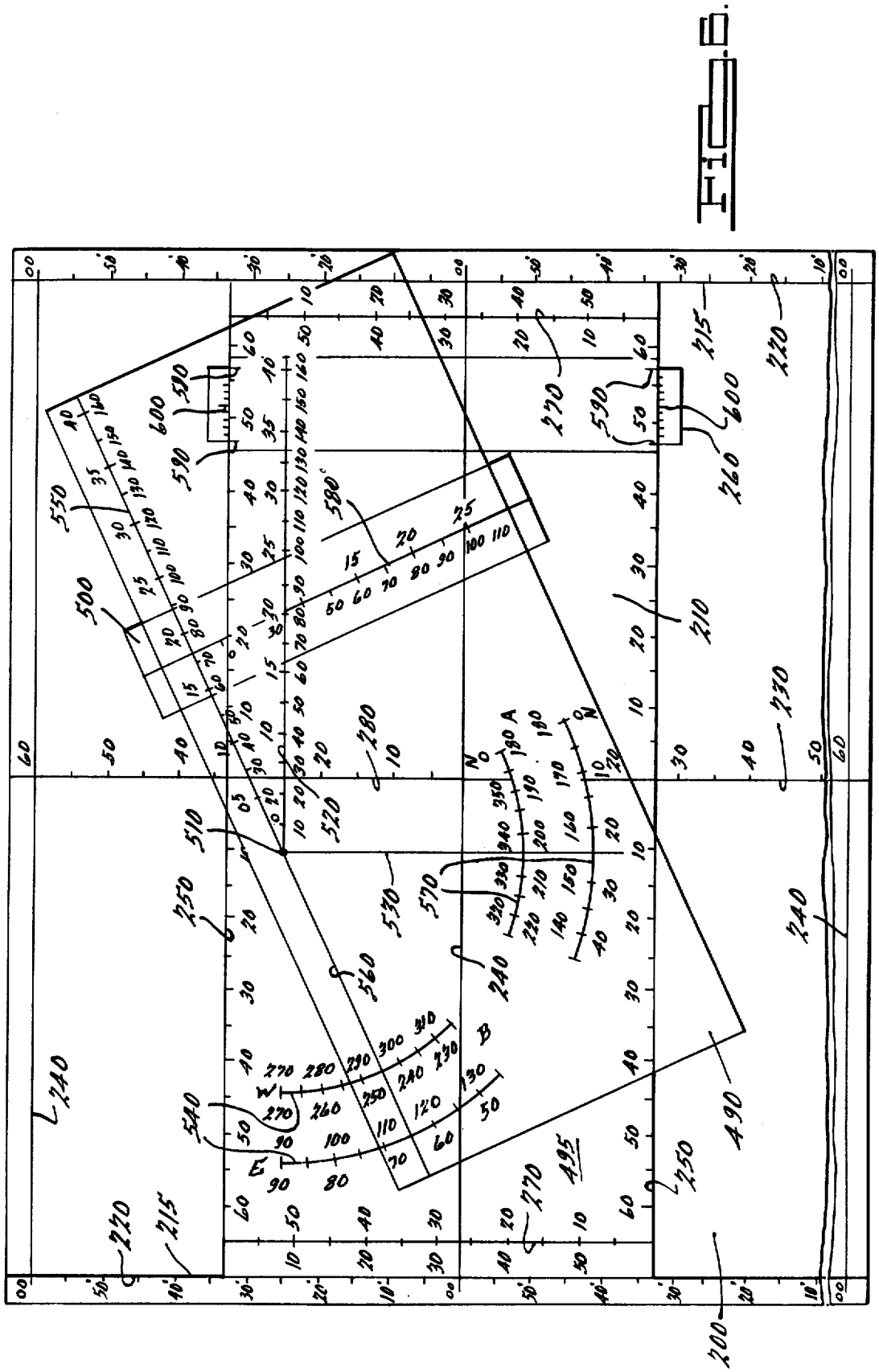

NAVIGATIONAL CALCULATING DEVICE

BACKGROUND OF THE INVENTION

This application is a continuation-in-part of application Ser. No. 051,678, filed June 25, 1979, entitled "Navigational Calculating Device", now U.S. Pat. No. 4,208,805, issued June 24, 1980.

The present invention pertains primarily to navigational calculating devices, and more particularly to mechanical navigational calculating devices which solve plane right triangles.

The following cited references are believed to be representative of the state of the art:

| U.S. Pat. No. | Inventor(s) | Issued |
|---|---|---|
| 1,439,936 | Wyckoff | December 26, 1922 |
| 1,730,852 | Jenny | October 8, 1929 |
| 2,481,846 | King | September 13, 1949 |
| 2,521,915 | Hartig | September 12, 1950 |
| 3,034,713 | Kuzenko | May 15, 1962 |
| 3,137,443 | Samuelson | June 16, 1964 |
| 3,414,190 | Lemiesz | December 3, 1968 |

Generally, various navigational methods exist for directing the movement of a craft from one place to another, including piloting, dead reckoning, celestial navigation, as well as numerous electronic devices or techniques. The choice of a particular method depends to a large extent on the type of craft. For example, a relatively slow-moving ship or land vehicle may use a different method of navigation than a relatively fast-moving aircraft, missile, or spacecraft. One commonly used method for navigating small water-going vessels is dead reckoning which may utilize plane right triangles to determine the distance a craft is believed to have moved.

Many instruments exist which can solve a plane right triangle, but most of them are designed for mathematical use and are not adapted or suitable for navigation. On the other hand, devices specially adapted for performing navigational calculations by mechanical means are very often rather cumbersome or tedious, or do not provide sufficient information due to insufficient input capability. For example, U.S. Pat. No. 1,439,936, although providing a full complement of input and output valves, utilizes logarithmic slide rule scales thereby making it difficult to set and difficult to read, and also is mechanically complicated in terms of both construction and operation.

It is a principle object of the present invention therefore to provide an improved navigational calculating device.

Another object of the present invention is to provide a mechanical navigational calculating device which is relatively simple to operate.

It is a further object of the present invention to provide a mechanical navigational calculating device which is uncomplicated in construction.

Other objects, features and advantages of the present invention will become apparent from the subsequent description and examples, and the appended claims taken in conjunction with the accompanying drawings.

SUMMARY OF THE INVENTION

In accordance with the present invention, a navigational calculating device is provided which with one setting requiring two operations can provide the information necessary to solve any plane sailing problem. The device can perform three principal functions: First, when set for course and distance run on that course, both departure (the distance removed east or west) and difference of latitude (the distance removed north or south) can be read directly off the instrument without any further setting or computation. Second, when set for departure and difference of latitude, the course and the distance to the destination can be read off the instrument. And third, when set for latitude, departure can be converted to difference of longitude, or difference of longitude can be converted to departure. Also, if any combination of two known arguments (course, distance, difference of latitude, departure) are entered on the instrument it can solve for the other two. The design of the invention lends itself to economical construction and can easily be molded from either opaque or transparent plastic.

BRIEF DESCRIPTION OF THE DRAWINGS

The foregoing objects and others will be pointed out more fully hereinafter in conjunction with the description of the preferred embodiment of the present invention illustrated in the accompanying drawings and examples and in which:

FIGS. 2 to 4 are plan views of components of the device of FIG. 1;

FIG. 5 is a plan view of another embodiment of the present invention, shown mounted on a plotting board; and FIG. 6 is a plan view of yet another embodiment of the present invention, shown mounted on a plotting board.

DESCRIPTION OF THE PREFERRED EMBODIMENT

Figure 1:
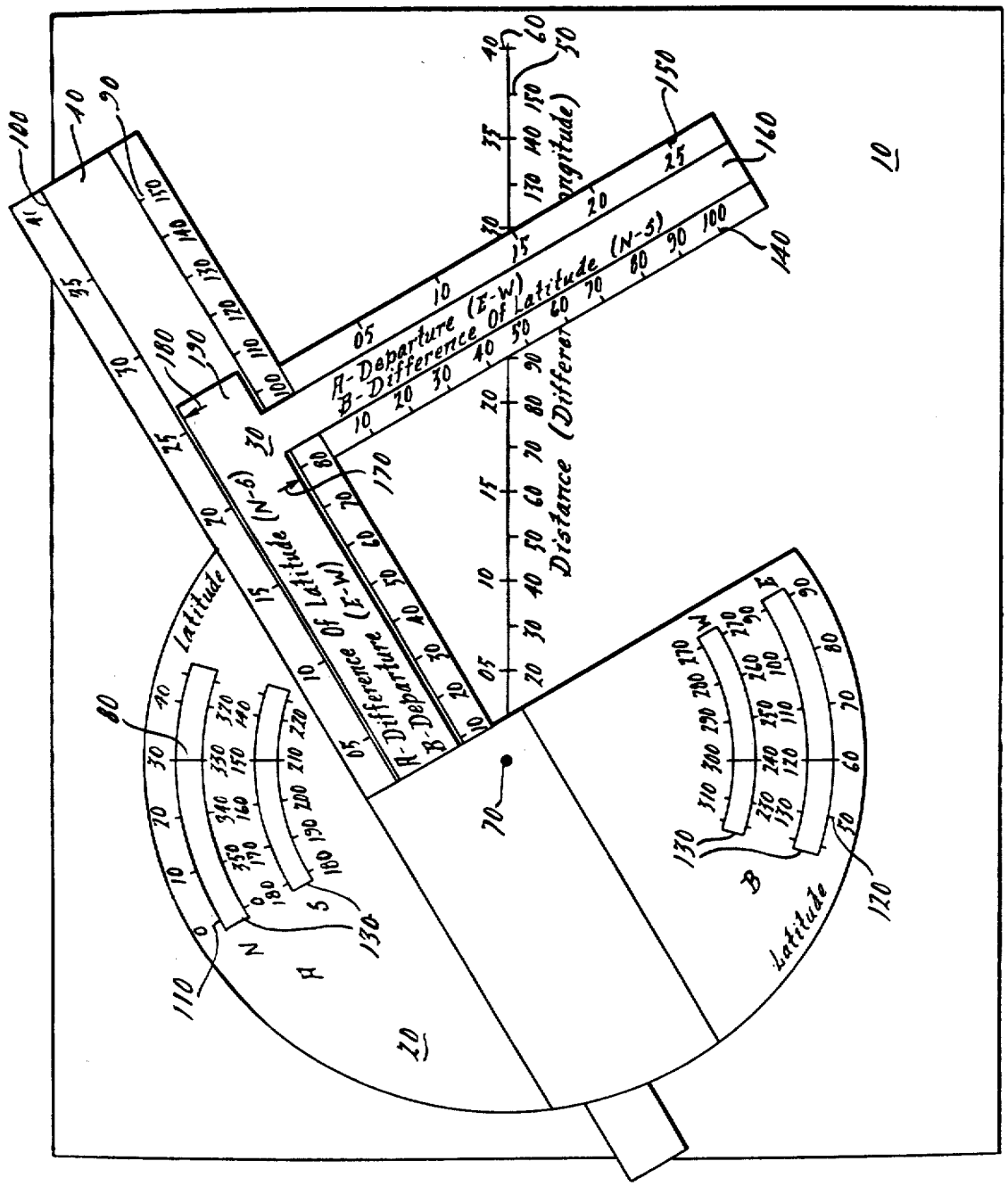
FIG. 1 is a plan view of a device embodying the invention.

Referring now to the drawings wherein the showings are for the purpose of illustrating a preferred embodiment of the invention only and are not for the purpose of limiting the invention, FIG. 1 shows the three major components comprising the present invention: a base plate 10, a rotating disk 20 with an arm, and a sliding square 30. Each of these three components is separately shown in FIGS. 2 to 4 respectively. Rotating disk 20 is rotatably attached to base plate 10, and sliding square 30 is slidably mounted on and relative to the arm 40 which extends from and is preferably, although not necessarily, an integral part of rotating disk 20. The disk and arm rotate over a 45° arc and the sliding square slides linearly back and forth over the length of arm 40.

The base plate 10 is printed with or otherwise has depicted thereon two horizontal distance scales 50 and 60 extending from a pivot point 70 and a vertical pointer line 80 running through the pivot point 70 perpendicular to the horizontal scales 50 and 60. The rotating disk 20 and arm 40 is similarly provided with two distance scales 90 and 100 extending from the pivot point 70, with the sliding square 30 slidably mounted therein. The dual scale arrangement provides versatility and greater accuracy for various distances. It permits solving for every conceivable combination of distances. These scales can be interpreted as any unit of measurement or distance, but for navigational use should be read as nautical miles. They may also be read decimally as on a slide rule. On the rotating disk 20 are eight segments of a compass "rose". Each segment represents one octant of the compass. The segments are arranged to that the most northern (NNE, NNW) and most southern (SSE, SSW) octants are at the top and the most eastern (ENE, ESE) and the most western (WNW, WSW) octants are at the bottom. The upper section of the disk is labeled A and the calculated results would be read as indicated on the sliding square. The lower section of the disk is labeled B and the calculated results would be just the opposite of section A as labeled on the square. The first octant 110 (0°–45°) is at the very top of the disk and the second octant 120 (45°–90°) is at the very bottom. This is to facilitate setting the instrument for latitude. The apertures 130 are necessary only if the rotating disk is opaque. It should be noted that the lower edge of the horizontal arm 40 is colinear with the pivot point 70. The 0°, 90°, 180°, and 270° points are colinear with the pivot point 70.

The sliding square 30 is provided with two distance scales 140 and 150 on the vertical arm 160 and two pointers 170 and 180 on the horizontal arm 190, one pointer for the upper scale and one for the lower scale. The pointers 170 and 180 are aligned with the edges of the vertical arm 160. The sliding square 30 is constructed so that its horizontal arm 190 slidably fits into the rotating arm 40 of the disk 20 and so that the vertical arm 160 fits flush with the lower edge of the rotating arm 40. Thus, the zero points on the distance scales 140 and 150 are on a line extending from the pivot point 70.

FIG. 1 illustrates the operation of the instrument. To solve a dead reckoning problem, the distance run on a given course must be known. The calculator of the present invention does not compute the new position, it only computes the change of position. The disk 20 is rotated until the vertical line 80 on the base intersects the course on the vertical pointer line 80. In the illustration, the device is set for 30°. This same setting applies to the seven other courses aligned with the vertical line 80. The sliding square 30 is positioned so that the edge of the vertical arm 160 intersects the distance run on the scale on the base plate 50 or 60. In the illustration, it is set for 90 miles (or 29.5 miles on the upper scale). The difference of latitude, 78 minutes, (or 25.5 minutes on the upper scale) is read from the horizontal arm 190 and the departure, 45 miles (or 14.7 miles) is read from the vertical arm 160. (Hereafter, difference of latitude will be referred to as nautical miles which are considered to be the equivalent of minutes of latitude.) This means that the vessel is 78 miles north and 45 miles east of its original position. If the course is interpreted as 60°, the results are reversed with difference of latitude being 45 miles and departure being 78 miles. If the course were 330°, the vessel would be 78 miles north and 45 miles west. If the course were 120°, the vessel would be 78 miles east and 45 miles south of the original position. The difference of latitude is always greater than departure when on one of the courses at the top of the disk. The departure is always greater when on one of the courses at the bottom of the disk.

The instrument can also be used to find the course to be steered and the distance to the destination. To solve for course and distance, the difference of latitude and the departure must be known. As also shown in FIG. 1, the departure, 255 miles, is set by positioning the sliding square 30 at 255 on the upper scale 100. The disk 20 is rotated until the difference of latitude, 147 miles on the distance scale 150 of the vertical arm 160, intersects the scale 60 on the base plate. The reading on the base plate at the point of the intersection, 294 miles, is the distance to the destination. The larger number is always entered on the horizontal arm. Since the larger number is the departure, the course will be read from the bottom of the disk. Which of the four possible courses (60, 120, 240, or 300 degrees) will be selected depends on the general direction of the destination. In actual practice, there should be no problem with ambiguity.

In some navigation problems it is necessary to convert nautical miles to minutes of longitude, or vice-versa. In solving problems of this nature, the degree scales 110 and 120 (0 to 45 degrees and 45 to 90 degrees) are set for and interpreted as degrees of latitude. The distance scale on the base plate 50 or 60 is set for and read as minutes of longitude. If the latitude is less than 45 degrees, the departure is entered on or read from the distance scale 90 or 100 on the horizontal arm 190. If the latitude is greater than 45 degrees, the departure is entered on or read from the vertical arm 160 of the sliding square 30. Assume that, in FIG. 1, the departure, 78 miles, is to be converted to difference of longitude in order to determine the longitude of the new position. The rotating disk 20 is set for 30 degrees latitude which is the middle-latitude between the previous position and the new position. For most short distance situations, the nearest half-degree of latitude is sufficiently accurate. The sliding square 30 is set for 78 miles on the horizonal arm 190. The difference of longitude, 90 minutes, is read from the difference of longitude scale 50 or 60 on the base plate 10 at the point of intersection with the vertical arm 160. Assume that (in FIG. 1) the middle-latitude is 60 degrees and that the difference of longitude, 90 minutes, is to be converted to departure. The rotating disk 20 is set for 60 degrees latitude and the sliding square 30 is set so that the vertical arm 160 intersects the longitude scale 50 or 60 at 90 minutes. The departure, 45 miles, is read from the vertical arm 160 at the point of intersection.

Some of the construction features which may be desirable, although not necessary, in a preferred embodiment of the present invention include the following:

1. The base plate 10 should be large enough so that it can be stored with no movable part protruding beyond the edge.

2. The disk 20 should be large enough to accommodate a clearly readable compass rose and to provide an adequate recess for the sliding square 30 when fully extended.

3. The degree scales should be grouped so that the same results will apply to any course in that group.

4. Some segments of the compass rose should read clockwise and some counter-clockwise to facilitate a 45° arc instead of a 90° arc. Using a 45° arc requires much shorter distance scales than does a 90° arc. It also permits locating the degree scales where they will not be obstructed by movements of the sliding square.

5. A 150 mile scale should be used to permit readings up to 100 miles on the vertical arm when set for 45°. This in turn permits readings to any quantity by interpreting the scales decimally.

6. A second scale should be provided to permit more accurate readings for distances under 40 miles and for distances over 150 miles.

7. The horizontal scale should begin at 10 permitting stronger construction around the pivot point. Distances under 10 miles may be read decimally from the 10 to 100 miles portion of the scale like a slide rule.

8. The horizontal arm should have a recessed groove to minimize misalignment of the sliding square. A tongue and groove slide rule type arrangement is appropriate.

9. The vertical arm should be constructed so it will lie flat on the base plate with the upper end flush with the edge of the horizontal arm.

It is very often desirable to provide a visual application of the calculation results of a navigational computer of the type shown in FIGS. 1 to 4. Even though a vessel's position can be determined solely by computation, a navigator can better visualize the progress of a vessel if the results are plotted on a navigational chart or plotting surface. For this reason, a plotting board may be provided which utilizes the base of a calculator of the type shown in FIGS. 1 to 4 as a plotting instrument. Conventional chart plotting requires that the plotting instrument (usually a course protractor) be rotated and carefully aligned with the compass course or compass bearing. Needless to say, this is impractical on many small craft which lack the necessary facilities. A plotting device of the type shown in FIGS. 5 and 6 requires only that the plotting and calculating instrument slide back and forth from the top to the bottom of the plotting board to correspond to the changing latitude of the vessel. The principal function of the plotting board would be to plot the progress of a vessel and to provide the necessary information to enter on the calculator to determine course and distance to the destination or to the next charted reference point. The plotting board could also be used to plot a line of position from a compass bearing of a charted object, or to plot celestial lines of position.

The devices shown in FIGS. 5 and 6 basically comprise a square or rectangular, flat plotting board 200 having an erasable writing surface, and a scaled, transparent, generally rectangular plotting instrument or calculator 210 which is generally of the type shown in FIGS. 1 to 4 hereinabove. The plotting instrument 210 fits into grooves 215 on either side of the plotting board 200 to keep it aligned, although other means of aligning the plotting board 200 and the plotting instrument 210 are possible and are believed to be well within the expertise of one skilled in the relevant art. As will be explained in more detail hereinbelow, the plotting instrument of FIG. 6 is a modified version of that of FIGS. 1 to 4 and 5. In both FIGS. 5 and 6, the plotting board 200 has latitude scales 220 along the left and right edges, and two north and south distance scales 230 along the vertical center line, each starting at the center and running to the upper and lower edges of the board. Horizontal lines cross the board at each even degree of latitude and three horizontal axes 240 may be provided across the full width of the board for reference. The plotting instrument 210, which should be transparent, has two horizontal distance scales 250 on each edge to measure departure. Each scale 250 starts at the center and runs to the left or right edges of the instrument. A horizontal position indicator 260 is mounted beneath and attached to the edges of plotting instrument 210. This indicator 260 slides back and forth along the full length of the plotter 210 to mark the position of the vessel on the horizontal scales. It is a generally rectangular vertical arm and has a vernier scale (10 divisions in the space of 11 spaces) on each end with a short index line at each end of each scale. The leading index line is used to indicate the position.

There are two latitude scales 270 on each side of the plotter 210 near the edge to measure difference of latitude. One scale on each side of the plotter 210 runs from top to bottom and the other from bottom to top. The vertical dimension of the plotting instrument preferably represents one degree of latitude. The plotter 210 also has a vertical line down the center which serves no separate function when used on the plotting board. It should be recalled that the plotter 210 is designed so that it can be used separately from the board to plot directly on a chart or plotting sheet. When so used, the vertical line is aligned with a charted meridian of longitude. A vernier scale 280 is located on this center line to permit accuracy to one-tenth of a mile when mounted on the plotting board. This plotting instrument 210 can also be used to prepare plotting sheets on plain paper. The arrangement of the distance scales on the board and the plotting instrument is designed to use the zero center point as the destination. Needless to say, the present invention has many uses, and is not limited to just the above configuration, since the destination can be plotted anywhere on the board.

To increase the capacity and accuracy of a navigational calculator of the type shown in FIGS. 1 to 4, several improvements may be made, without any significant change in the basic design, in order to better adapt the calculator for use with a plotting board. Referring now to FIG. 5, and with regard to such improvements, four of the compass segments 290 have been transferred from the disk to the base. The segments are arranged so that all of the course scales read clockwise as they appear on a compass. When the disk 300 is set at "0" (north) the scales 310 on the disk 300 continue from where the scales on the base leave off. Otherwise, the location of the scales are the same as shown in FIGS. 1 to 4. This arrangement permits a smaller disk without reducing the size and readability of the compass scales. Also, the distance scales 320 on the horizontal arm 330 are continued in reverse on the sliding square 340 to permit extension of the square beyond the end of the arm. This greatly increases the capacity of the instrument. The extension of the horizontal arm requires a proportional increase in the length of the vertical arm 350 of the sliding square 340. To avoid having the lengthened vertical arm or extension 360 protrude beyond the edge of the base, it telescopes to provide the additional length when needed. This extension, as well as the other extensions referred to herein, comprise sliding scale means which make each scale extensible beyond its normal closed position. The distance scales 370 on the movable part are continued on the fixed part of the arm. The lower edge of the horizontal arm has been raised slightly to provide for an index pointer 380 on the telescoping vertical arm. It is not essential that the lower edge be colinear with the pivot point as long as the zero point on the vertical arm remains colinear with the pivot point. Distance scales 385 are also provided on the vertical arm 350. In addition, an index line 395 is provided on the sliding square.

Further with regard to FIG. 5, vernier scales have been provided on various scales. The sliding square has a vernier scale 390 on each end of the square. When one of the scales is beyond the distance scale, the other scale can be used. These scales have 10 divisions in the space of 11 on the main scale. The distance and difference of longitude scale 400 on the base can be extended, when necessary, beyond the edge of the base. When distance exceeds 60 miles, an extension 410 is fully extended so that 50 and 60 on the extension are aligned with 50 and 60 on the fixed scale 400. An appropriate groove 415 is provided. This extension also has a secondary function. Whether extended or retracted, it can be adjusted to provide exact decimal divisions on the vernier scales 420 at either end of the scale. A reverse distance scale 425 having an index line 435 is also provided on the sliding square 340. The vernier scales for the distance scale on the base are located on the extension. Since they are on the opposite side from the distance scale, a companion scale is provided at each end to facilitate reading. These scales, as well as the vernier scale 430 on the vertical extension, have 10 divisions in the space of 9 on the main scale.

Yet further with regard to FIG. 5, a time, speed, and distance calculator has been incorporated into the disk and sliding square without any significant modification of the design. The calculator is an adaption of the "A" and "B" scales of a conventional slide rule. The left half 440 of the "A" scale is located along the upper edge of the groove 450 for the sliding square and the left half 460 of the "B" scale is located on the upper edge of the sliding square. This "B" scale 460 includes the first place (number 2) beyond the center unit 1 to provide greater flexibility in setting the slide. The unit 1 position on each end of the "A" scale 440 is labeled "Time" and the 6 position is circled to represent time in minutes. A slide rule cursor 470, with the hair line labeled "Speed" on the "A" scale and "Distance" on the "B" scale, if fitted onto tracks above and below the groove 450 for the sliding square. Other features of the device of FIG. 5, such as the pivot 480, are generally the same as the device of FIGS. 1 to 4, and are incorporated in this description.

As referred to above, FIG. 6 is a modified version of the calculator shown in FIG. 1 to 4 and 5 as discussed above. It is a somewhat simpler device, both in terms of construction and operation. However, it has basically the same elements as the devices described above in FIGS. 1 to 4 and 5. Instead of a disk and arm with a sliding square, it has a rotating rectangular plate 490 with a sliding vertical arm 500 mounted on it. All parts are transparent, except that the base may be opaque when not used as a plotting instrument. The plotting scales, along with the center vertical line, shown in the illustrations are not an integral part of the calculating device.

The rotating plate 490 is attached to the base 495 with a pivot 510 and the sliding arm is mounted on the edges of the rotating plate and slides back and forth between the pivot point and the end of the scale. The base 495 has a horizontal distance and difference of longitude scale 520 extending to the right from the pivot point and a vertical index line 530 extending downward from the pivot point. The same dual scale arrangement used in FIGS. 1 to 4 is shown in FIG. 6. Compass scales 540 for the ENE, ESE, WSW, and WNW octants of the compass are located on the base 495 to the left of the pivot point. The 90° and 270° points must be colinear with the pivot point and the horizontal distance scale. These are the same scales that are located at the bottom of the disk (labeled "B") in the device of FIGS. 1 to 4, and the calculated results for these courses are applied as explained earlier. The rotating plate 490 has a horizontal distance scale 550 identical to the scale on the base extending to the right of the pivot point. This scale may be located on a line anywhere above or below the pivot point as long as it is parallel with a line colinear with the pivot point. A horizontal index line 560 extends to the left of the pivot point. Compass scales 570 for the NNE, NNW, SSE, and SSW octants of the compass are located on the rotating plate 490 below the pivot point. The 0° and 180° points must be colinear with the pivot point. These are the same scales that are located at the top of the disk (labeled "A") in the device of FIGS. 1 to 4, and the calculated results for these courses are applied as explained earlier.

Further with regard to FIG. 6, the sliding arm 500 has a vertical distance scale 580 extending from a line colinear with the pivot point which, in this illustration, is the horizontal distance scale on the rotating plate. Even though the horizontal scale may be located elsewhere, the 0 point of the vertical scale must be colinear with the pivot point. When the instrument is used as a plotter, the sliding vertical arm can be used as a horizontal position indicator and would slide back and forth over the full length of the rotating plate. The horizontal position indicator 260 has four index lines 590 thereon as shown in FIG. 6, and also contains a vernier scale 600 on its upper and lower ends. In the illustration of FIG. 6, the course is set for 25° on the "A" scale and 65° on the "B" scale. The arm is set for a run of 80 miles on the distance scale on the base. The reading on the horizontal scale is 72.5 miles and on the vertical scale it is 33.8 miles. The function, the operation, and the application of the results of the present invention are substantially identical with the devices described earlier.

With regard to the operation of the device of the present invention, including a plotting board, the original position or departure point is plotted on the plotting board 200 using data obtained from a navigational chart. This position is plotted relative to the destination or relative to charted parallels of latitude and meridians of longitude. The edge of the plotting instrument or plotter 210 is aligned with the original position. Either edge may be used but it is more practical to use the trailing edge in most situations. A short line is drawn on the plotting surface along the leading edge of the plotter to intersect one of the vertical distance scales on the plotter. The horizontal position indicator is also aligned with the original position. After the vessel has traveled a given distance, the course and distance are entered on the calculator as explained hereinabove to obtain difference of latitude and departure. The plotter is advanced until the mark on the plotting board intersects the vertical distance scale at the value representing difference of latitude. The new position is determined by moving the horizontal position indicator east or west for the number of miles representing departure. The position is plotted on the trailing edge at the intersection of the index line and the edge of the plotter. If the difference of latitude exceeds 60 miles, the plotter is advanced the excess over 60 miles, and the new position is plotted on the leading edge. Both difference of latitude and departure can be plotted to an accuracy of one-tenth of a mile by using the vernier scale. To obtain course and distance to the destination, one would find the difference of latitude between the current position and the destination from the vertical distance scale 270 and the departure from the horizontal scale 250 on the edge of the plotter, and enter this information on the calculator as explained hereinabove to provide the course and distance. In the illustrations, the plotter is set for about 27 miles south (on the lower edge) of the center of the board which represents the destination. The horizontal position indicator is set for about 46 miles east of the center (on the left index line).

Further calculations may include setting the sliding square for difference of latitude or departure, whichever is larger, on the horizontal arm. In the illustration of FIG. 5, the horizontal arm is set for 67.3 miles and the vertical arm at 27.2 miles. This requires that the square 340 be extended beyond the end of the arm until the index pointer 435 is aligned with 67.3 on the continuing scale on the square. The vernier scale at the left end of the arm 390 reads 0.3. To set the vertical arm for 27.2 miles, the vertical arm is extended until the 0 index line 380 is aligned with 27.2 on the fixed part of the arm. Again, the exact decimal division can be read from the vernier scale 430. The disk is rotated until the distance scale 400 on the base intersects the vertical scale 370 at exactly 25 (the end of the movable scale). The distance at the point of intersection is 72.6 miles. Since the distance is beyond the end of the fixed scale 400, the extension 410 is extended and the distance is read from the extended part of the scale. The exact decimal division is found by slightly adjusting the extension 410 until the even digit (72) is exactly aligned with the vertical scale line. The vernier scale 420 at the left end of the extension will read 0.6. The course (22° in the NNE segment) is read from the segment representing the general direction of the vessel.

The time, speed, and distance calculator, 440 and 460, is used primarily to determine the distance run at a given speed for a given time. To determine distance run, the hairline of the cursor 470, labeled "Speed", would be set for the speed of the vessel on the "A" scale 440 and the slide 340 would be positioned so that the elapsed time on the "B" scale 460 would be aligned with the unit 1 position (labeled "Time") at either end of the "A" scale 440. The distance run would be read from the "B" scale 460 at the intersection with the hairline of the cursor 470 labeled "Distance". If the elapsed time had been less than an hour, the slide 340 would have been set so that the time in minutes would be set at the "6" position (6 circled). The calculator can also be set for distance and speed to determine the time required to reach the destination.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A navigational calculating device comprised of:
(a) a plotting board,
(b) a base plate slidably mounted on said plotting board, said base plate containing intersecting horizontal and vertical scales and having at least one vertical scale adjacent a vertical edge thereof and at least one horizontal scale adjacent a horizontal edge thereof,
(c) a disk rotatably mounted on said base plate at a position coincident with the intersection of said horizontal and vertical scales, said disk comprising at least one radially spaced arcuate scale coaxial with said disk and superimposed over the vertical scale on the base plate, said arcuate scale being of constant radius and having an origin radially aligned with the intersection of said scales on said base plate, said disk having an arm affixed thereto, the lower edge of which is aligned with said intersection of the scales on the base plate, said arm containing at least one longitudinal scale, and
(d) a square slidably mounted on said arm, said square comprising both a vertical portion having an upper edge adjacent the lower edge of said arm and containing at least one scale having its origin aligned with the intersection of the scales on the base plate, and a horizontal portion integral with said vertical portion adapted for sliding movement relative to said arm.

2. The navigational calculating device of claim 1 wherein said plotting board is generally rectangular in shape and contains at least one vertical scale.

3. The navigational calculating device of claim 2 wherein said plotting board has an upper surface which is erasable.

4. The navigational calculating device of claim 1 wherein said base plate has a horizontal position indicator slidably mounted beneath it, said indicator extending across the vertical width of said base plate and being movable along the horizontal scale which is adjacent a horizontal edge of said base plate.

5. The navigational calculating device of claim 1 wherein the horizontal scale on said base plate, the longitudinal scale on said arm, and the scale on the vertical portion of said sliding square, each comprise sliding scale means making each scale extensible beyond its normal closed position.

6. The navigational calculating device of claim 5 wherein at least one of said scales comprises a vernier scale.

7. The navigational calculating device of claim 1 wherein said disk and arm contain a time, speed, and distance scale and an indicator slidable along the scale.

8. The navigational calculating device of claim 1 wherein said base plate, disk, arm, and sliding square are all generally transparent.

9. A navigational calculating device comprised of:
(a) a plotting board,
(b) a base plate slidably mounted on said plotting board, said base plate containing intersecting horizontal and vertical scales and having at least one vertical scale adjacent a vertical edge thereof and at least one horizontal scale adjacent a horizontal edge thereof,
(c) a generally planar member rotatably mounted on said base plate at a position coincident with the intersection of said horizontal and vertical scales, said member comprising at least one radially spaced arcuate scale coaxial with said member at said intersection of said horizontal and vertical scales and superimposed over the vertical scale on the base plate, said arcuate scale being of constant radius and having an origin radially aligned with the intersection of said scales on said base plate, said member containing at least one longitudinal scale, and
(d) a vertical square slidably mounted on said member, said square containing at least one scale which is perpendicular to the longitudinal scale on said member and which has its origin aligned with the intersection of the scales on the base plate.

10. The navigational calculating device of claim 9 wherein said plotting board is generally rectangular in shape and contains at least one vertical scale.

11. The navigational calculating device of claim 10 wherein said plotting board has an upper surface which is erasable.

12. The navigational calculating device of claim 9 wherein said base plate has a horizontal position indicator slidably mounted beneath it, said indicator extending across the vertical width of said base plate and being movable along the horizontal scale which is adjacent a horizontal edge of said base plate.

13. The navigational calculating device of claim 9 wherein said base plate, generally planar member, and vertical square are all generally transparent.

14. A navigational calculating device comprised of:
(a) a base plate containing intersecting horizontal and vertical scales,
(b) a generally planar member rotatably mounted on said base plate at a position coincident with the intersection of said horizontal and vertical scales, said member comprising at least one radially spaced arcuate scale coaxial with said member at said intersection of said horizontal and vertical scales and superimposed over the vertical scale on the baseplate, said arcuate scale being of constant radius and having an origin radially aligned with the intersection of said scales on said base plate, said member containing at least one longitudinal scale, and
(c) a vertical square slidably mounted on said member, said square containing at least one scale which is perpendicular to the longitudinal scale on said member and which has its origin aligned with the intersection of the scales on the base plate.

* * * * *